(No Model.) 5 Sheets—Sheet 1.
W. J. TRIPP.
LOCOMOTIVE.
No. 511,564. Patented Dec. 26, 1893.
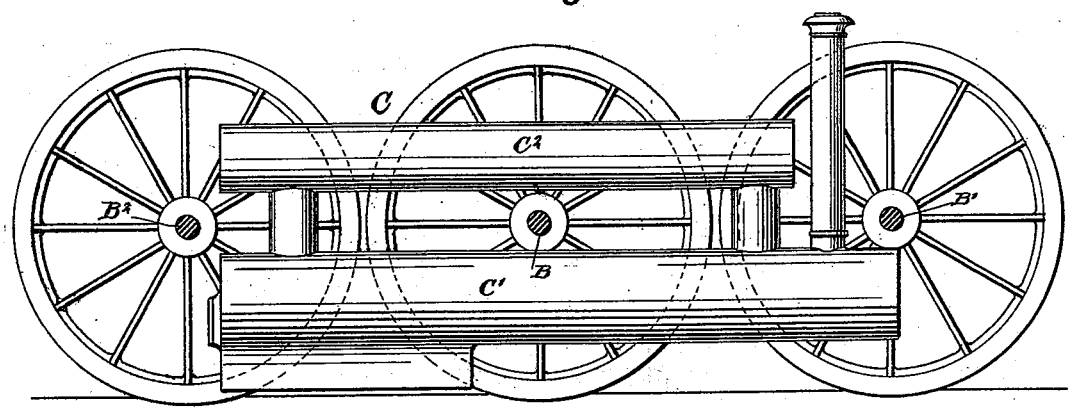
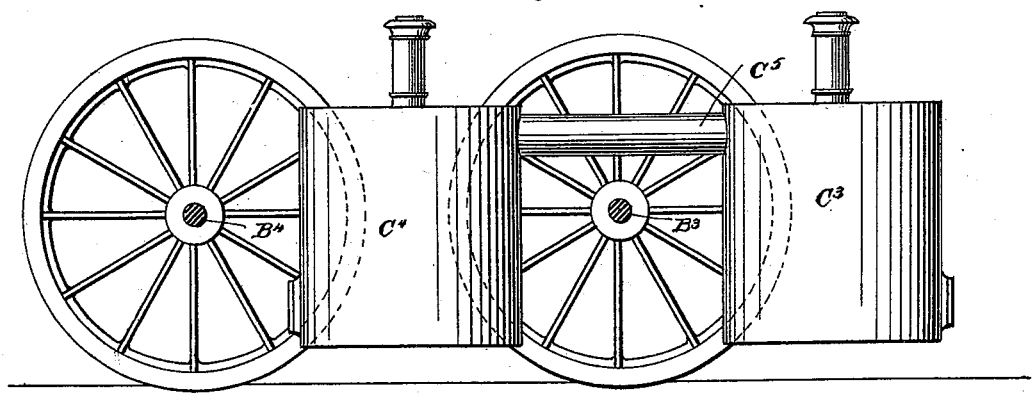
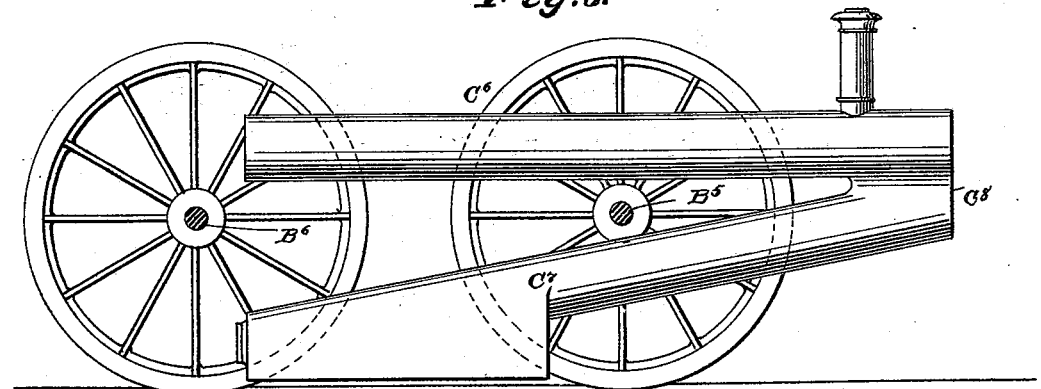
WITNESSES:
J. A. Bergstrom
C. Sedgwick
INVENTOR
W. J. Tripp
BY
Munn & Co
ATTORNEYS.

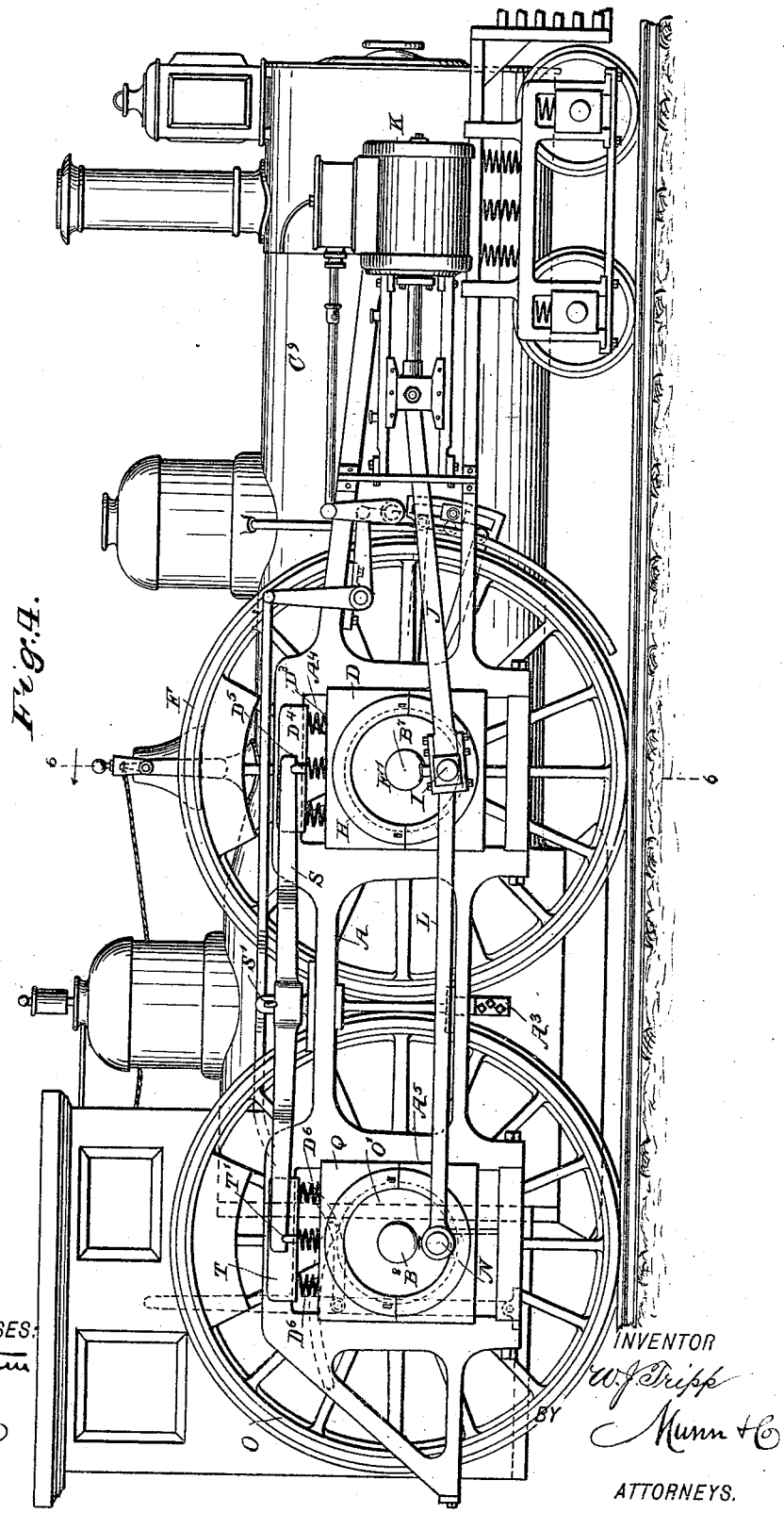

(No Model.)  5 Sheets—Sheet 3.
W. J. TRIPP.
LOCOMOTIVE.
No. 511,564. Patented Dec. 26, 1893.
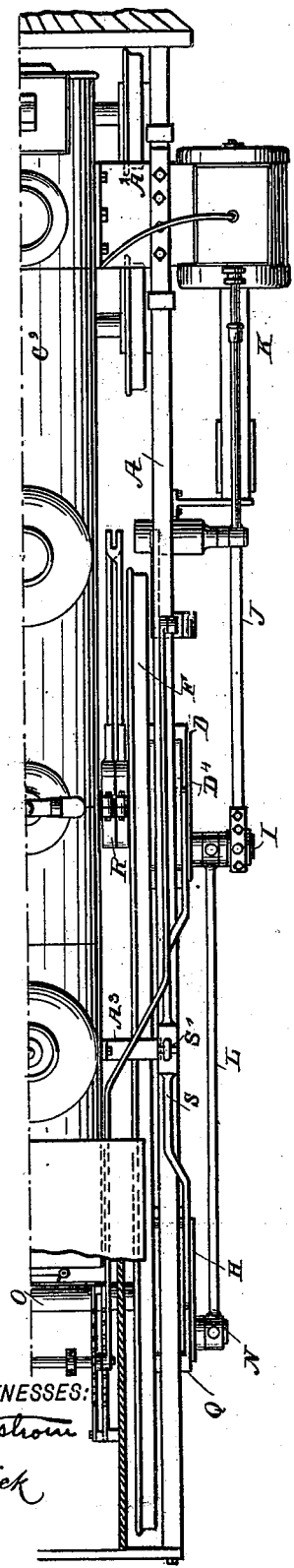
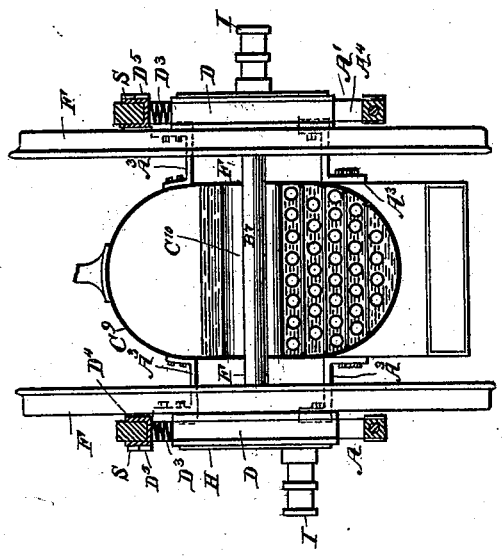
WITNESSES:
J. A. Bergstrom
C. Sedgwick
INVENTOR
W. J. Tripp
BY
Munn & Co
ATTORNEYS.

(No Model.) 5 Sheets—Sheet 4.
W. J. TRIPP.
LOCOMOTIVE.
No. 511,564. Patented Dec. 26, 1893.
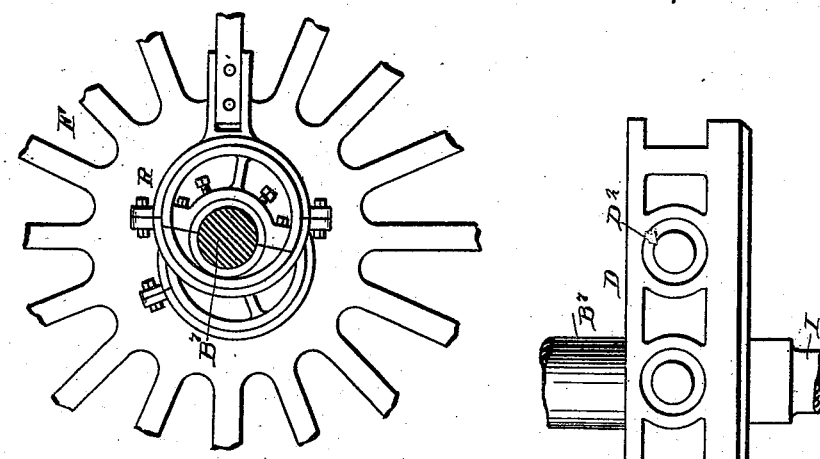
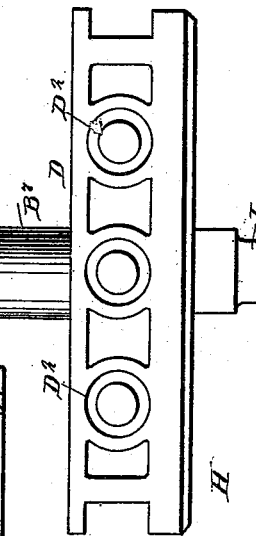
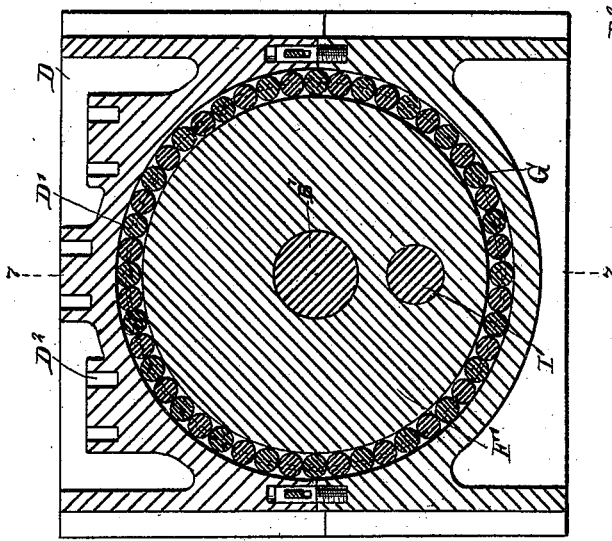
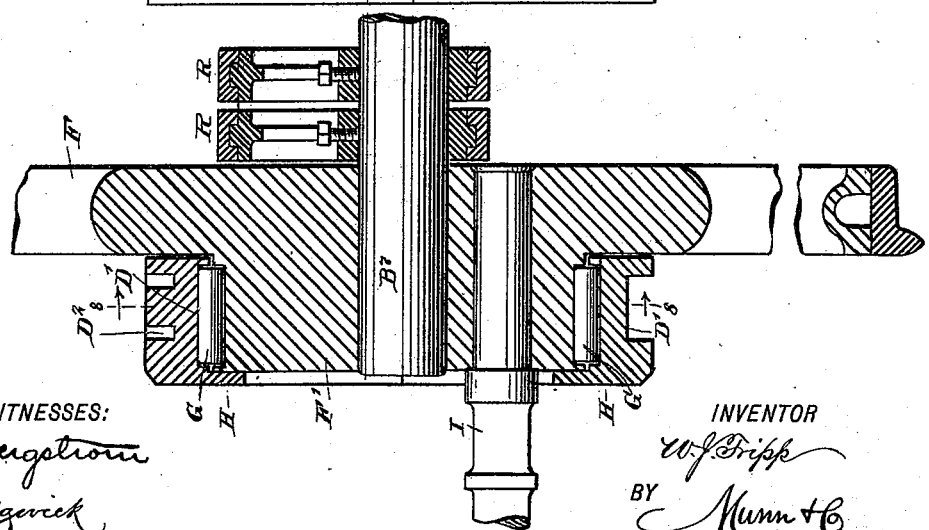
WITNESSES:
J. A. Bergstrom
C. Sedgwick
INVENTOR
W. J. Tripp
BY Munn & Co.
ATTORNEYS.

(No Model.) 5 Sheets—Sheet 5.
W. J. TRIPP.
LOCOMOTIVE.
No. 511,564. Patented Dec. 26, 1893.
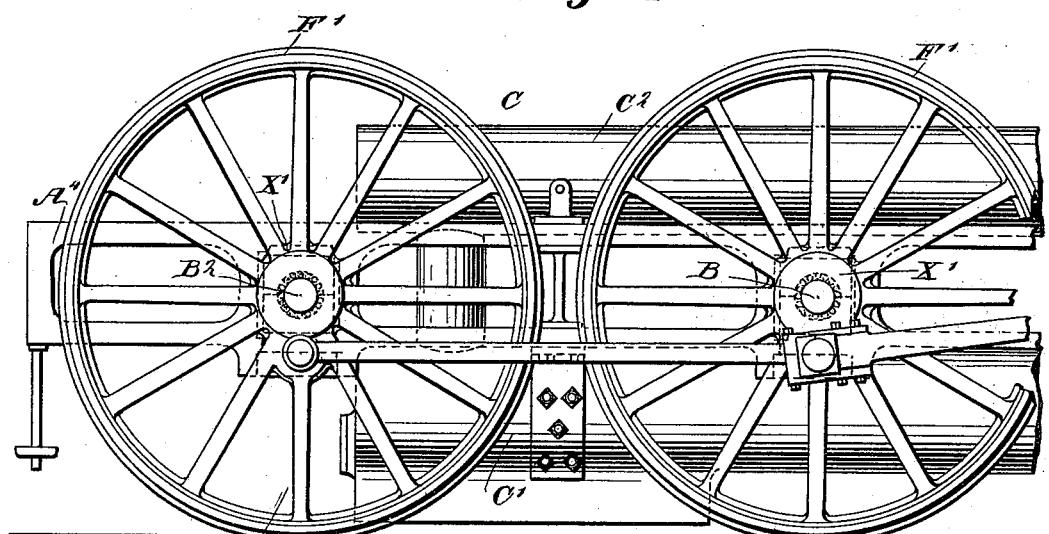
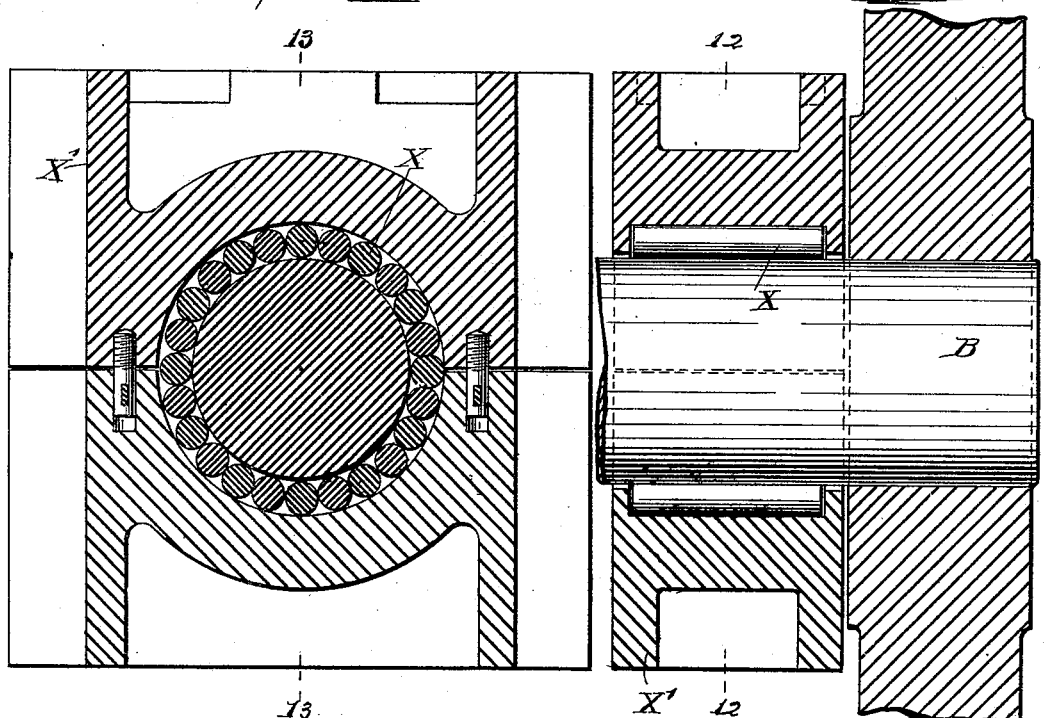

UNITED STATES PATENT OFFICE.

WILLIAM JAY TRIPP, OF NEW YORK, N. Y.

LOCOMOTIVE.

SPECIFICATION forming part of Letters Patent No. 511,564, dated December 26, 1893.

Application filed April 1, 1893. Serial No. 468,657. (No model.)

*To all whom it may concern:*

Be it known that I, WILLIAM JAY TRIPP, of the city, county, and State of New York, have invented certain new and useful Improvements in Locomotives, of which the following is a full, clear, and exact description.

The invention relates to locomotives such as shown and described in the Letters Patent of the United States No. 369,482, granted to me under date of September 6, 1887.

The object of the invention is to provide certain new and useful improvements in locomotives, whereby driving wheels of very large dimensions can be employed to obtain a high rate of speed; and the boiler or boilers may be located as low down as possible, in order to bring the preponderance of the weight of the boiler or boilers below the driving wheel axles and the points of suspension, to insure greater stability.

The Invention consists of driving wheels having their axles extended exteriorly of the boiler, either above, in the front, or in the rear thereof.

The invention further consists of driving wheels provided with hubs each journaled in the side frames and each carrying a crank pin for connection with the engines or the front or rear driving wheels, by means of a pitman or connecting rod.

The invention also consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figures 1, 2 and 3, are sectional side elevations of the improvements (with details omitted), and showing the driving wheels and axles arranged relatively to various styles of boilers. Fig. 4 is a side elevation of the improvement with the axle of the forward driving wheels passing transversely through the boiler, as described and set forth in the Letters Patent mentioned above, and with the axle of the rear driving wheels located behind the boiler and directly above or below the fire box door of the same; the detail mechanism being also shown. Fig. 5 is a plan view of the same, showing one half of the locomotive, with parts in section. Fig. 6 is a cross section of the improvement on the line 6—6 of Fig. 4. Fig. 7 is an enlarged cross section of one of the driving wheels, roller bearings, and journal boxes, on the line 7—7, of Fig. 8. Fig. 8 is a sectional front elevation of part of the same on the line 8—8 of Fig. 7. Fig. 9 is a plan view of the same. Fig. 10 shows an elevation of the side of one of the driving wheels, and the axle of the same in section, together with the eccentrics and their connections. Fig. 11 is an enlarged side elevation of the improvement illustrated in Fig. 1, and with details added. Fig. 12 is an enlarged sectional side elevation of the bearing for the drive wheel axle, the section being taken on the line 12—12 of Fig. 13; and Fig. 13 is a cross section of the same on the line 13—13 of Fig. 12.

The principal feature of the improvement, as illustrated in Figs. 1, 2 and 3, is the arrangement of the axles of the driving wheels exteriorly of the boiler, the preponderance of the weight of the boiler and attachments being thereby placed below the driving wheel axles and the points of suspension, to insure greater stability and to admit of the use of larger driving wheels than at present employed. As illustrated in Fig. 1, three driving wheels, with their axles B, B', and $B^2$, are shown, of which the main axle B, extends between the sections C', and $C^2$, of the boiler C, while the forward axle B', extends transversely across and in front of the boiler C, the rear axle extending transversely across and in the rear of the boiler C. As illustrated in Fig. 2, the boiler is provided with the sectional parts $C^3$ and $C^4$, connected by a flue or flues, $C^5$, below which passes the main axle $B^3$, extending transversely across and between the boiler sections $C^3$ and $C^4$, the rear axle $B^4$, being located in the rear of the boiler section $C^4$, a suitable distance from the same. As illustrated in Fig. 3, the boiler has its sections $C^6$ and $C^7$, connected with each other at the front end at $C^8$, the upper section $C^6$, being horizontal, and the lower section $C^7$, being inclined rearwardly and downwardly so as to form sufficient space for the passage of the axle $B^5$ of the forward driving wheels, the axle $B^6$ of the rear driving wheels being located at the rear of the boiler as shown. The rear driving wheel axles $B^2$ and $B^6$, Figs. 1 and 3, can also be located between the sections of their respective boilers when so desired, and operated either as single drivers, or in connection with the forward drivers $B'$, Fig. 1 and $B^5$, Fig. 3.

As illustrated in Figs. 4, 5 and 6 the axle $B^7$ of the main driving wheels, passes transversely through a tubular opening in the boiler $C^9$, but this arrangement is shown and described in the Letters Patent above referred to, but no mention is made therein with reference to the axle $B^8$ of the rear driving wheels, which are herein described and for which claims will be made hereinafter.

In all the forms above described I arrange the detail mechanism in the manner shown in Figs. 4 to 9, and presently to be described, and as both sides of the locomotive are alike in construction it suffices to describe but one.

The two side frames A and $A'$, are connected at their front ends by the saddles $A^2$ with the boiler $C^9$, and near the rear ends by the usual brackets $A^3$ with the outer shell of the fire box of the boiler. Near the middle of the side frames A, and $A'$, is an opening $A^4$ in which is fitted to slide vertically the box D, formed in its center with a large circular opening $D'$ (Fig. 8) into which projects the crank disk $F'$, which forms part of the hub of the driving wheel F, the latter being secured on the axle $B^7$. The diameter of the crank disk $F'$ is somewhat less than the diameter of the circular opening $D'$, in the box D, so that an annular space is formed in which are placed the friction rollers G, as plainly shown in Fig. 8. On the top of the box D, are arranged a number of annular grooved sockets $D^2$ engaged by the lower ends of the springs $D^3$, the upper ends of the same being engaged in similar sockets in a U-shaped shoe $D^4$, fitted loosely on the top part of the side frames A and $A'$ as plainly shown in Figs. 4 and 6, the journal boxes D being thus mounted yieldingly in the side frames to insure the easy riding of the boiler $C^9$.

In the crank disk and hub $F'$, of the driving wheel F, is secured a crank pin I of the ordinary type, connected by a pitman or connecting rod J, with the locomotive engine K in the usual manner, so that the engine revolves the driving wheel F, to propel the locomotive forward or backward. In case the rear driving wheels are employed, as illustrated in Figs. 1, 2, 3, and 4, then the crank pin I, is also connected by a connecting rod L, with the wrist pin N, secured in the crank disk and hub $O'$, of the driving wheel O, the driving wheels F, and O, being secured to their respective axles $B^7$ and $B^8$. The crank disk $O'$ of the rear driving wheel O is journaled by ball or roller bearings held in the box Q, in the same manner as in the box D, and mounted to slide vertically in guideways formed in the rear end of the side frames A and $A'$.

The axle of the main driving wheel F is provided on the inner side of the latter with the usual eccentrics R, for operating the valve gear of the locomotive engine in the usual manner. The boxes D and Q are connected with each other by suitable equalizing mechanism preferably of a form having bifurcated ends which span the side frames A and $A'$, as shown in Fig. 4. The shoes $D^4$ and T are provided with lugs $D^5$ and $T'$ on which rest the bifurcated ends of the equalizing lever S, pivoted on a pin $S'$ of the respective frames A and $A'$, thereby maintaining a permanent tension on the equalizing lever by the springs $D^3$ and $D^6$ on the top of the boxes D and Q.

In case front driving wheels are employed as illustrated in Fig. 1, then the crank pins of the main driving wheels are connected in the usual manner with the crank pin of the forward driving wheel, journaled in roller bearings similar to the driving wheels F, and O, as previously described.

As illustrated in Figs. 11, 12 and 13, the locomotive side frames $A^4$ are located on the inside of the main drive wheels $F'$ and each of the axles B $B'$ and $B^2$ for the said drive wheels is journaled in roller bearings X contained in boxes $X'$ carried by the said side frames $A^4$ as will be readily understood by reference to Figs. 12 and 13. It will also be seen that when the side frames are located on the inside of the driving wheels, and journaled directly on the axles of the driving wheels in the usual manner I am enabled to use ball or roller bearings in place of the plain journal boxes usually employed for this purpose.

It will be seen that by the peculiar arrangement shown and described, the preponderance of the weight of the boiler and attachments is considerably below the center of the driving wheels and points of suspension, and hence greater stability of the locomotive is insured. It will also be seen that the boiler and attachments ride very easily, owing to the yieldingly mounted boxes D and Q in the side frames A and $A'$, and the load is more evenly distributed by the equalizing arrangement. As illustrated in Figs. 4 and 8 the boxes D and Q are made in sections to permit of the more conveniently assembling and disconnecting the same when necessary. It will be further seen that I am enabled to use driving wheels of larger dimensions so as to permit of running the locomotive at a higher rate of speed than can at present be attained in ordinary practice, and by employing ball or roller bearings in the journal boxes D and Q, I reduce the friction in the same to a minimum. It will also be seen that when a sectional boiler is employed (as per Figs. 1, 2, and 3) the space between the sections of the same will be sufficient to admit of the use of inside journal connections, the side frames A, and $A'$ being placed on the inside of the driving wheels and the journals being formed directly on the axles of the driving wheels in the usual manner, roller bearings being employed therewith in place of the plain journal boxes usually employed for this purpose.

Having thus fully described my invention, I claim as new and desire to secure by Letters Patent—

1. A locomotive provided with driving wheels having hubs, the peripheral cylindrical surfaces whereof form the journals of the driving wheels, and ball or roller bearings in which said hubs are journaled, substantially as shown and described.

2. A locomotive provided with driving wheels, ball or roller bearings for the same, side frames, and boxes mounted yieldingly in the side frames, said boxes containing the bearings of the driving wheels, substantially as shown and described.

3. A locomotive provided with driving wheels, ball or roller bearings for the same, side frames, and boxes capable of a yielding vertical movement in the side frames, said boxes containing the bearings of the driving wheels, substantially as shown and described.

4. A locomotive provided with driving wheels having hubs, the peripheral cylindrical surfaces whereof form the journals of the driving wheels, side frames, boxes capable of sliding in the said side frames, and ball or roller bearings in which said hubs are journaled, substantially as shown and described.

5. A locomotive provided with driving wheels having hubs, the peripheral cylindrical surfaces whereof form the journals of the driving wheels, side frames, boxes capable of a yielding vertical movement in the said side frames, and ball or roller bearings in which said hubs are journaled, substantially as shown and described.

6. A locomotive provided with driving wheels of large diameter, having their hubs extended outwardly to form a crank disk and each carrying a crank pin secured therein, substantially as shown and described.

7. A locomotive provided with driving wheels of large diameter, having their hubs extended outwardly to form a crank disk, and a crank pin secured therein; the periphery of the crank disks forming the journals of the driving wheels, and journaled in ball or roller bearings, substantially as shown and described.

8. In a locomotive, the combination with side frames, of driving wheels provided with crank disks journaled on their peripheries, and boxes mounted yieldingly in the said side frames and in which the peripheries of the said crank disks are journaled, substantially as shown and described.

9. In a locomotive, the combination with side frames, of axles, driving wheels secured thereon, and each provided with a crank disk, boxes mounted yieldingly in the said side frames, and in which the said crank disks are journaled, and ball or roller bearings for the said crank disks in the said boxes, substantially as shown and described.

WILLIAM JAY TRIPP.

Witnesses:
THEO. G. HOSTER,
C. SEDGWICK.